US011864283B2

(12) United States Patent
Bonne et al.

(10) Patent No.: US 11,864,283 B2
(45) Date of Patent: Jan. 2, 2024

(54) TEMPERATURE SENSING FOR A MICRO-LED ARRAY

(71) Applicant: Lumileds LLC, San Jose, CA (US)

(72) Inventors: Ronald Johannes Bonne, Plainfield, IL (US); Zhi Hua Song, Palo Alto, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 18/030,756

(22) PCT Filed: Oct. 8, 2021

(86) PCT No.: PCT/US2021/054128
§ 371 (c)(1),
(2) Date: Apr. 6, 2023

(87) PCT Pub. No.: WO2022/076791
PCT Pub. Date: Apr. 14, 2022

(65) Prior Publication Data

US 2023/0345598 A1 Oct. 26, 2023

Related U.S. Application Data

(60) Provisional application No. 63/089,622, filed on Oct. 9, 2020.

(51) Int. Cl.
*H05B 45/18* (2020.01)
*G09G 3/32* (2016.01)

(52) U.S. Cl.
CPC ............... *H05B 45/18* (2020.01); *G09G 3/32* (2013.01)

(58) Field of Classification Search
CPC .................................. H05B 45/18; G09G 3/32
See application file for complete search history.

(56) References Cited

U.S. PATENT DOCUMENTS 10,440,786 B1 10/2019 Stoegner et al.
2011/0310134 A1 12/2011 Nakatsuka
(Continued)

FOREIGN PATENT DOCUMENTS

WO WO-2020039291 A1 2/2020
WO WO-2022076791 A1 4/2022

OTHER PUBLICATIONS

"International Application Serial No. PCT/US2021/054128, Response to Written Opinion and Amendment Under Article 34 Before the International Preliminary Examination Authority" filed Aug. 9, 2022, 14 pgs.

(Continued)

*Primary Examiner* — Daniel D Chang
(74) *Attorney, Agent, or Firm* — Schwegman, Lundberg & Woessner, P.A.

(57) ABSTRACT

A temperature monitor and control system for a pixel array includes a first driver connected to a first pixel connected to bus by a first switch, a second driver connected to a second pixel connected to a bus by a second switch, and a control block including connection to the first and second switches. The control block turns on the first switch and turns off the second switch, measures bus voltage, determines an LED forward voltage shift of the first pixel and corresponding temperature shift for the first pixel based on the determined forward voltage shift, and adjusts a driving current for first pixel based on the determined temperature shift.

19 Claims, 6 Drawing Sheets

(56) References Cited

U.S. PATENT DOCUMENTS

| | | | | |
|---|---|---|---|---|
| 2012/0003156 | A1 | 1/2012 | Dang et al. | |
| 2013/0193851 | A1* | 8/2013 | Alon | H05B 45/46 315/121 |
| 2016/0066372 | A1 | 3/2016 | Lombardi et al. | |
| 2017/0062683 | A1* | 3/2017 | Chen | H01L 33/145 |

OTHER PUBLICATIONS

"International Application Serial No. PCT/US2021/054128, International Preliminary Report on Patentability dated Jan. 6, 2023", 5 pgs.
"International Application Serial No. PCT/US2021/054128, International Search Report dated Dec. 28, 2021", 2 pgs.
"International Application Serial No. PCT/US2021/054128, Written Opinion dated Dec. 28, 2021", 10 pgs.
"Japanese Application Serial No. 2023-521616, Notification of Reasons for Rejection dated Sep. 19, 2023", with English translation, 5 pages.
"Chinese Application Serial No. 202180083033.5, Office Action dated Oct. 25, 2023", with machine English translation, 11 pages.

* cited by examiner

TEMPERATURE SENSING FOR A MICRO-LED ARRAY

RELATED APPLICATION

This application is a U.S. National Stage Filing under 35 U.S.C. 371 from International Application No. PCT/US2021/054128, filed on Oct. 8, 2021, which claims the benefit of priority to U.S. Provisional Patent Application No. 63/089,622 titled "Temperature Sensing for a Micro-LED Array" and filed on Oct. 9, 2020, the entire contents of both of which are hereby incorporated herein by reference in their entireties.

TECHNICAL FIELD

The present disclosure relates generally to light emitting diode (LED) junction level temperature sensing in a monolithic or segmented LED die.

BACKGROUND

Use of micro-LED displays or projectors is an emerging technology in the lighting and display industry. A micro-LED array can contain arrays of thousands to millions of microscopic LED pixels that actively emit light. Micro-LEDs of the array can be individually controlled. As compared to other display technologies, micro-LED arrays can have a higher brightness and better energy efficiency, making them attractive for a variety of applications, such as television display or backlight, automotive lighting, or mobile phone lighting.

SUMMARY

In embodiments, a temperature monitor and control system for a pixel array includes a first driver connected to a first pixel connected to a bus by a first switch. A second driver can be connected to a second pixel connected to a bus by a second switch. A control block can be configured to support a connection to the first and second switches, with the control block operable to turn on the first switch and turn off the second switch. The control block can measure bus voltage to determine LED forward voltage and corresponding temperature for the first pixel, with the control block making adjustments to the pixel array based on the temperature. In some embodiments, the pixel array includes a microLED pixel array.

In embodiments, the control block is operable to turn on the second switch and turn off the first switch. The control block measures bus voltage to determine LED forward voltage and corresponding temperature for the second pixel, with the control block making adjustments to the pixel array based on the temperature.

In embodiments, the first and second switches are a subset of n-switches connected to buss in the pixel array, with the control block configurable to close all but one of the n-switches on a bus, allowing for scan of each switch connected pixel and determination of LED forward voltage and corresponding temperature for each of the switch selected pixels.

In embodiments, adjustments to the pixel array based on the temperature are based on changes to at least one of pixel array supplied current amplitude and pulse width modulation.

In embodiments, the first and second driver further respectively comprise first and second current sources and first and second connections to pulse width modulation switches.

In embodiments, temperature dependency is determined by a calibration that includes dependency based on at least one of LED design, manufacturing factors, and supplied current.

In embodiments, a microLED pixel array system includes a plurality of microLED pixels connected to a bus, each pixel being independently addressable to allow on/off operation. A control block is connected to the plurality of microLED pixels, the control block being operable to measure bus voltage to determine LED forward voltage and corresponding temperature for the one of the plurality of microLED pixels connected to a bus. During operation, the control block can make adjustments to the plurality of microLED pixels based on the temperature.

In embodiments, a control method for an LED array includes providing a plurality of microLED pixels connected to a bus, each pixel being independently addressable to allow on/off operation. Each of the plurality of microLED pixels can be measured to determine the forward voltage shift. The measured forward voltage can be compared to a reference voltage determined during calibration. Temperature results can be calculated and saved, with results for each of the plurality of microLED pixels being available.

In embodiments, the measuring step further includes the step of switching off all but one of plurality of microLED pixels to measure the forward voltage shift.

In embodiments, the plurality of microLED pixels are repeatedly scanned during operation.

In embodiments, the step of adjusting the microLED pixels is based on the temperature.

and

Figure 6:
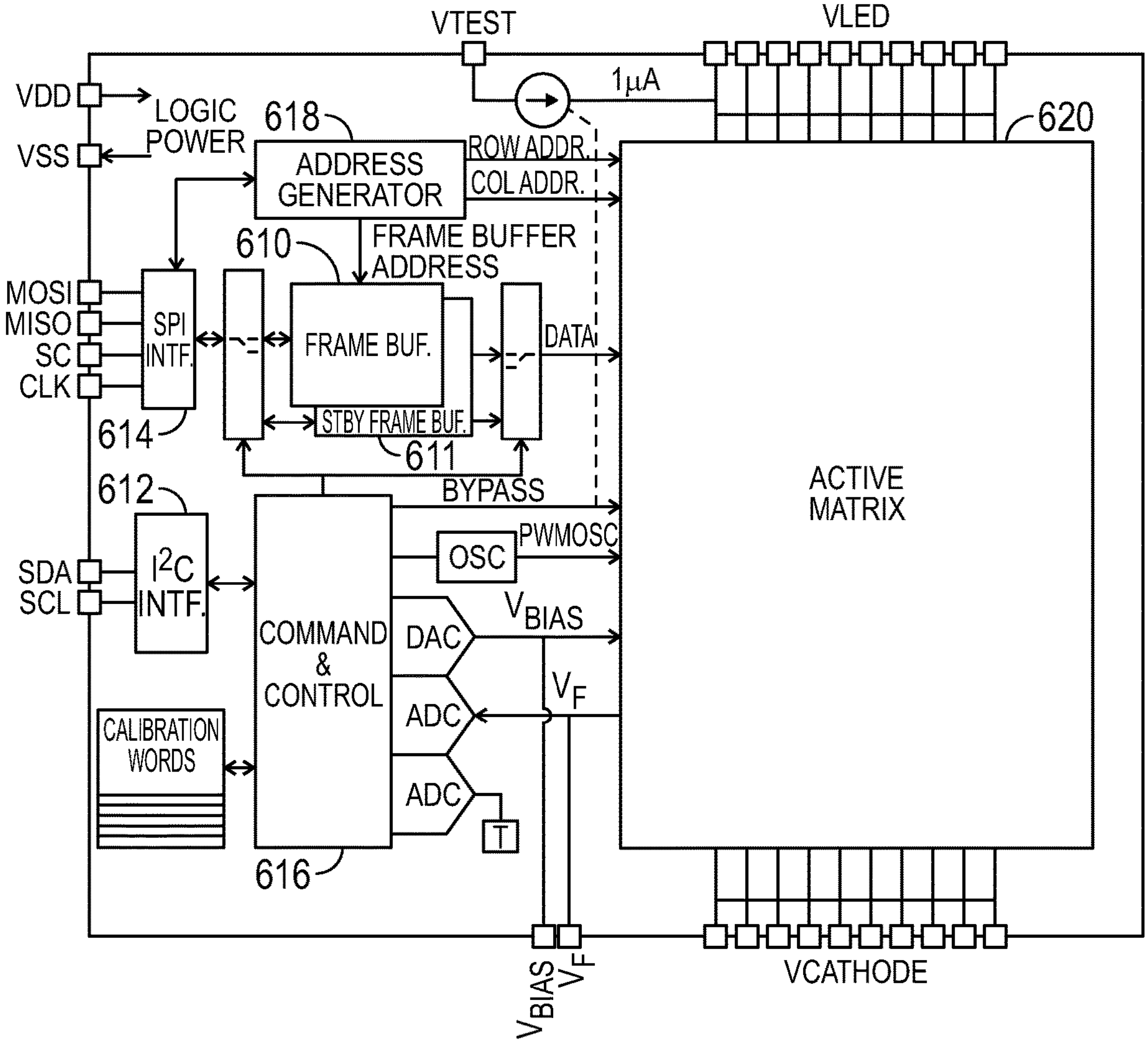

FIG. 6 illustrates a detailed chip level implementation of a system having a microLED control module.

DETAILED DESCRIPTION

Unfortunately, emitted light color or intensity in a micro-LED array is a function of LED temperature. Varying temperature across a die or substrate supporting micro-LEDs can result in unacceptable micro-LED color or intensity changes. When the display is uniform, these changes can be seen in a display as color or light intensity banding, bright spots, or dark spots. For smaller LED pixel arrays, controlling the intensity change due to temperature variation can be accomplished using feedback sensors. However, such control systems are generally not available for larger micro-LED matrix pixel arrays that already face additions operational power and data management problems that are not experienced by the smaller LED pixel arrays. Individual light intensity of thousands or millions of emitting pixels can be monitored and adjusted to compensate for temperature if the techniques for smaller micro-LED array are on larger micro-LED arrays. Such a task is not practical at higher display refresh rates because of the number of pixels.

Figure 1:
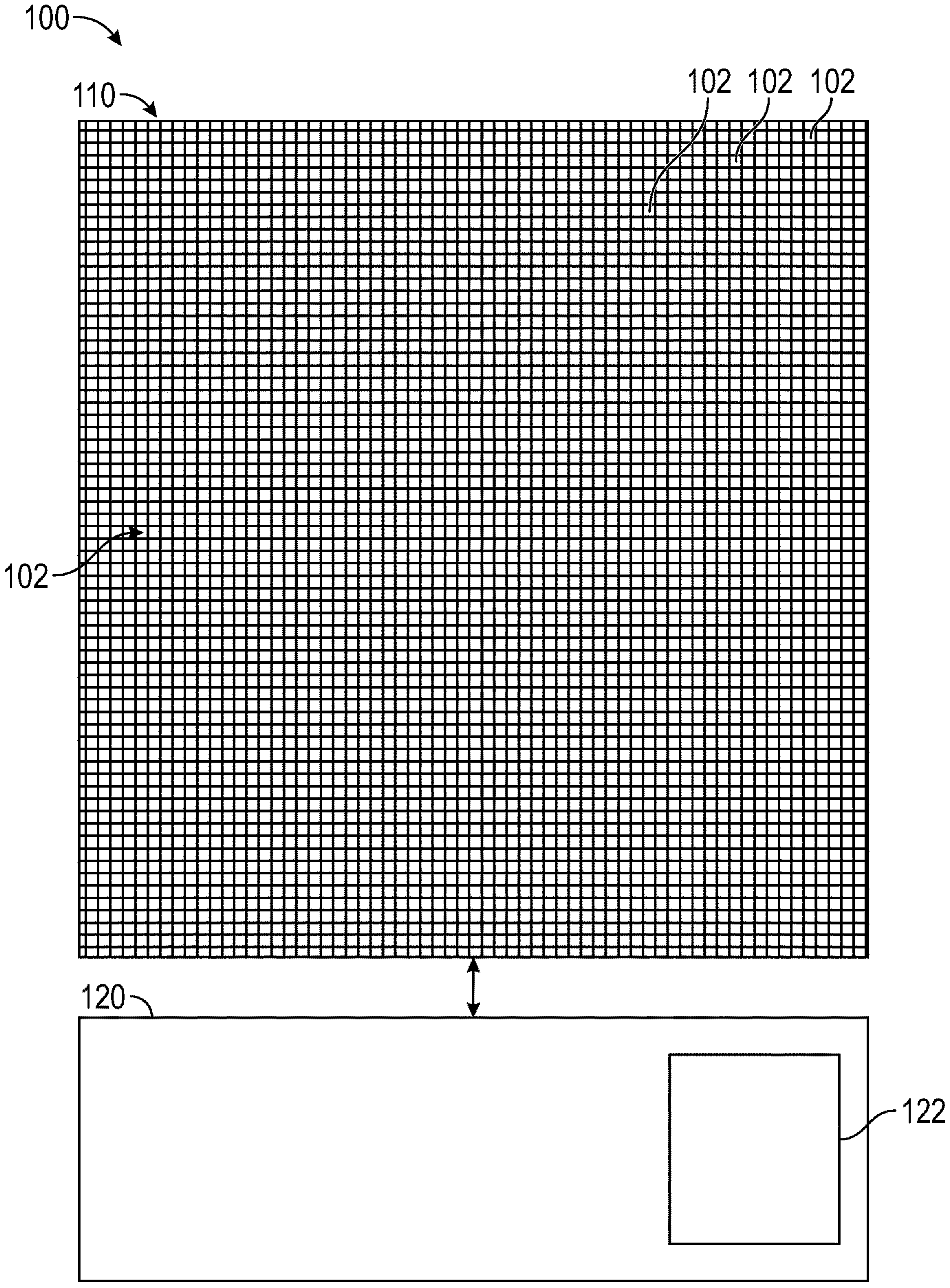
FIG. 1 illustrates an LED display system that includes an LED array that supports individual pixel temperature measurements.

FIG. 1 illustrates an LED display system 100 that includes an LED array 110. As illustrated, each box in array 110 defines a pixel 102 that can have temperature individually measured using a system controller 120 that supports a temperature monitor and control system 122. The temperature monitor and control system 122 for the LED array 110 can include circuit-based drivers that allow measurement of bus voltage. The measurement of bus voltage can be used to determine LED forward voltage, which can be mapped to a corresponding temperature for the pixel. Using the system controller 120, adjustments to the LED array 110 based on the detected temperature can be made. Adjustments can include varying pixel intensity, color, and on/off state for individual pixels 102 or selected groups of pixels, such as by adjusting a pulse width modulation (PWM) duty cycle of one or more colors.

In some embodiments, the LED array 110 can be formed from an array or arrays of microLEDs (sometimes called "μLEDs" or "uLEDs"). MicroLEDs can support high density pixels having a lateral dimension less than 100 micrometers (μm) by 100 μm. In some embodiments, microLEDs with dimensions of about 50 μm in diameter or width and smaller can be used. Such microLEDS can be used for the manufacture of color displays by aligning, in close proximity, microLEDs that emit at multiple visible wavelengths, for example, red, blue, and green wavelengths. In some embodiments, microLEDS can be defined on a monolithic gallium nitride (GaN) or other semiconductor substrate, formed on segmented, partially, or fully divided semiconductor substrate, or individually formed or panel assembled as groupings of microLEDs. In some embodiments, the LED array 110 can include small numbers of microLEDs positioned on substrates that have a centimeter scale area or greater. In some embodiments, the LED array 110 can support microLED pixel arrays with hundreds, thousands, or millions of LEDs positioned together on centimeter scale area substrates or smaller. In some embodiments, microLEDS can include LEDs sized between 30 microns and 500 microns. In some embodiments, the microLED pixel arrays can be formed from LEDs of various types, sizes, and layouts. In some embodiments, one-dimensional (1D) or two-dimensional (2D) matrix arrays of individually addressable LEDs can be used. Commonly, N×M arrays where N and M are respectively between two and one thousand can be used. Individual LED structures can have a square, rectangular, hexagonal, polygonal, circular, arcuate, or other surface shape. Arrays of the LED assemblies or structures can be arranged in geometrically straight rows and columns, staggered rows or columns, curving lines, or semi-random or random layouts. LED assemblies that can include multiple LEDs formed as individually addressable pixel arrays are also supported. In some embodiments, radial or other non-rectangular grid arrangements of conductive lines to the LED can be used. In other embodiments, curving, winding, serpentine, and/or other suitable non-linear arrangements of electrically conductive lines to the LEDs can be used.

Figure 2:
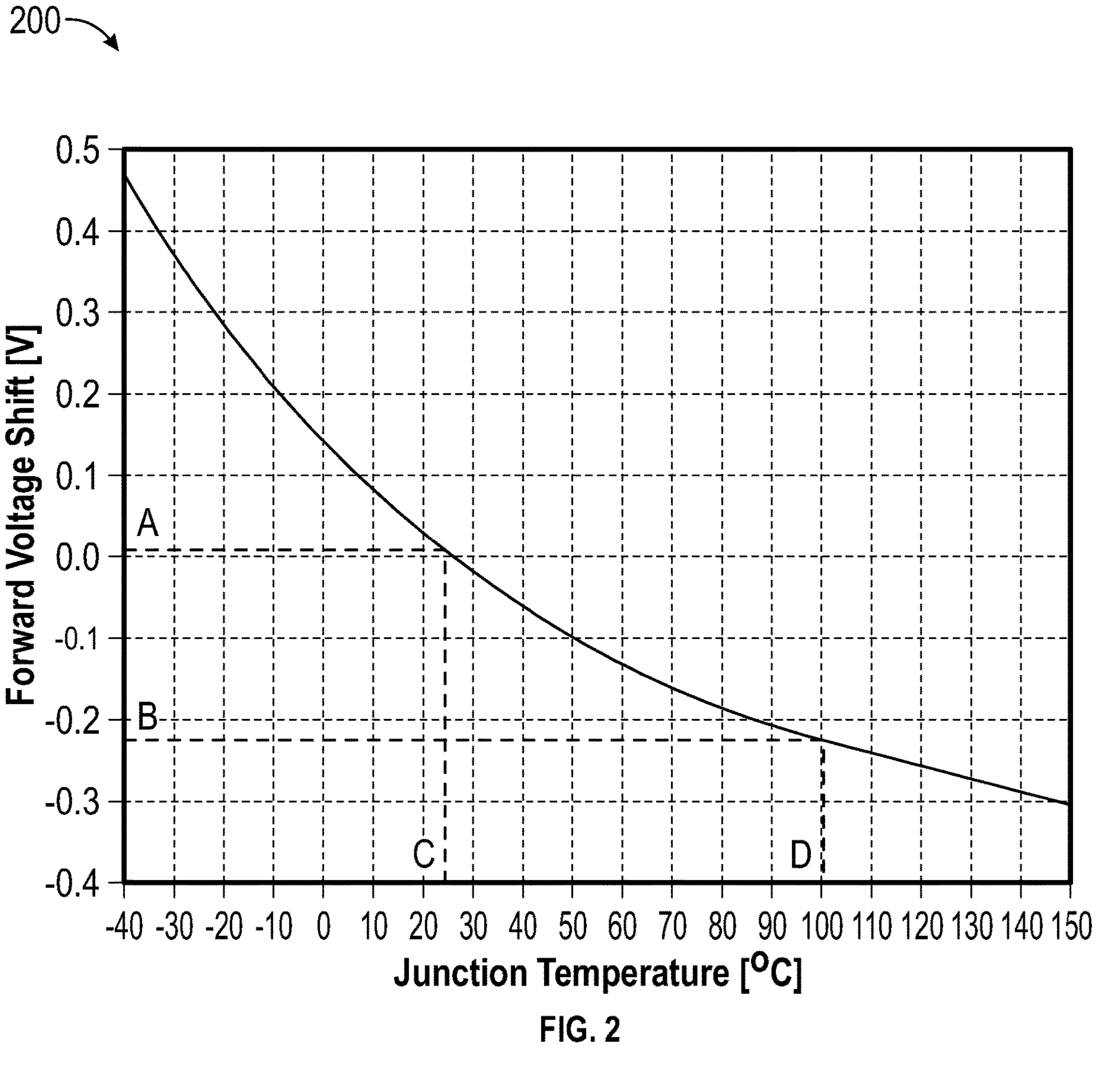
FIG. 2 is a representative graph of forward voltage shift versus junction temperature.

FIG. 2 is a representative graph 200 of forward voltage shift versus junction temperature that illustrates temperature determination using forward voltage shift measurement. As seen in graph 200, an LED formed with a PN junction can be provided with current that induces a forward voltage shift in the LED. Measurement of the associated forward voltage shift of the LED has a negative temperature coefficient of a few millivolts per degree Celsius, typically −2 mV/° C. FIG. 2 shows an example curve illustrating the shift of forward voltage as a function of LED junction temperature at a certain current value.

Figure 3:
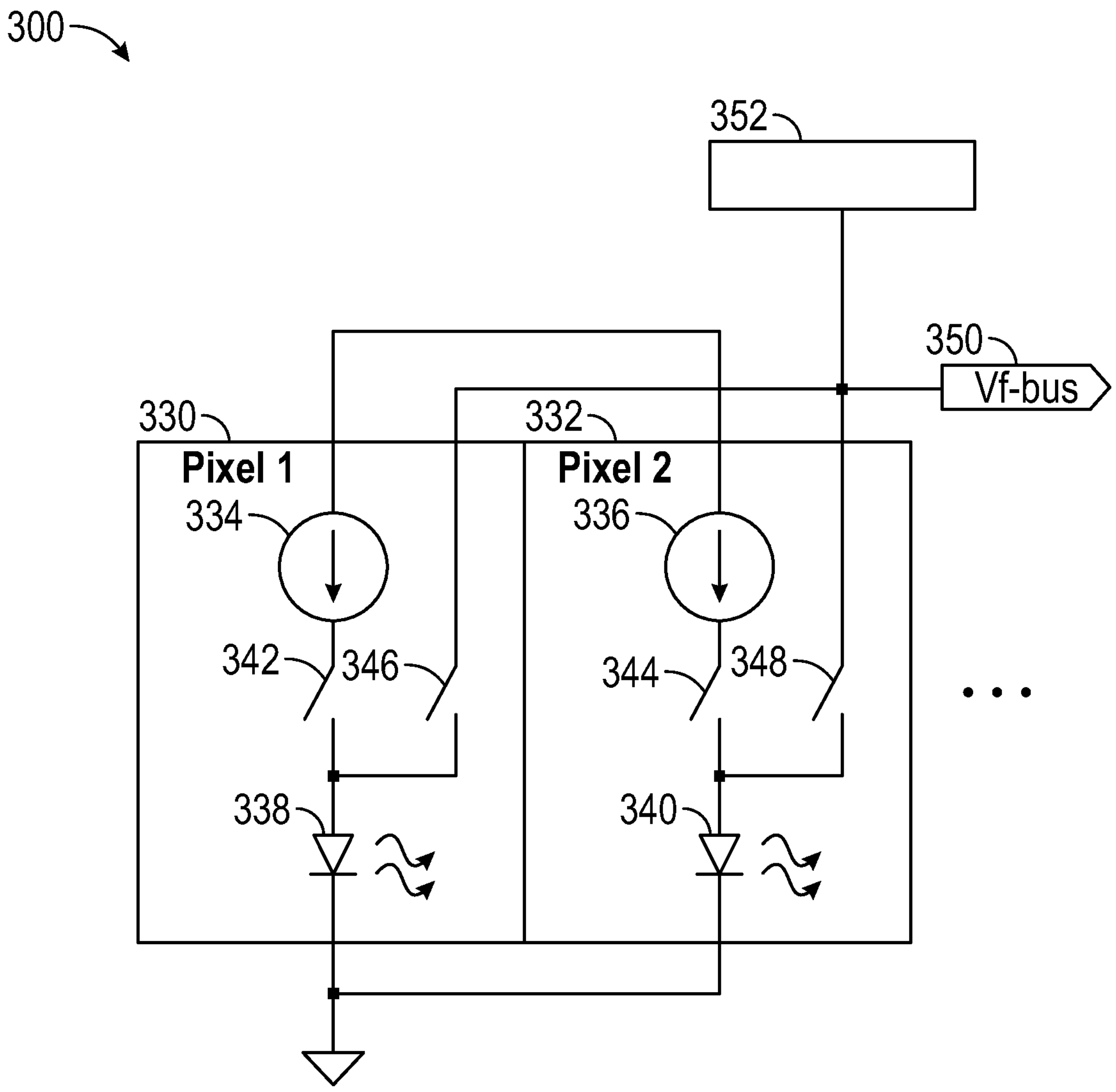
FIG. 3 illustrates an embodiment of a representative circuit driving two pixels that includes temperature measuring capability.

FIG. 3 illustrates an embodiment of pixel level circuitry 300 that permits measuring pixel temperatures. In this circuitry 300, two representative pixels 330, 332 can be from an microLED array that supports thousands to millions of pixels. Each pixel 330, 332 has a respective driver and a respective LED 338, 340. The illustrated circuit 300 includes a current source 334, 336 and a pulse width modulation (PWM) switch 342, 344, combined to form the driver, but alternative current and control systems that provide a current to drive the individual LED pixel can be used. Another switch 346 is connected to the anode of LED 338 of the pixel 330, and a switch 348 is similarly connected to the anode of LED 340 of the pixel 332. The other terminal of both switches 346, 348 are illustrated as being connected to a common power node bus 350.

During operation, a control block 352 can scan a microLED array by electrically turning on the switch 346, 348 connected to each LED 338, 340 one by one. For instance, when the control block 352 turns on the switch 346 and turns off the switch 348 and concurrently turns off all other switches connected to other pixels, the voltage on the bus 350 equals the LED forward voltage of the LED 338. The bus 350 of the LED 338 of the pixel 330 can be sent to the control block 352 for processing and/or storage in memory. When the switch 346, and all other switches of other pixels of the LED array, are turned off and only the switch 348 is turned on, the forward voltage of the LED 340 of the pixel 332 can be measured at the bus 350 and processed in the control block 352. In this way, the LED voltage, on the bus 350, of pixels in the matrix can be measured one at a time.

The control block 352 can be controlled by a higher-level controller, such as the temperature monitor and control system 122 (see FIG. 1) or command and control module 616 (see FIG. 6). The command-and-control module 616 of FIG. 6 can include or implement the functionality of the temperature monitor and control system 122 or vice versa.

Figure 4:
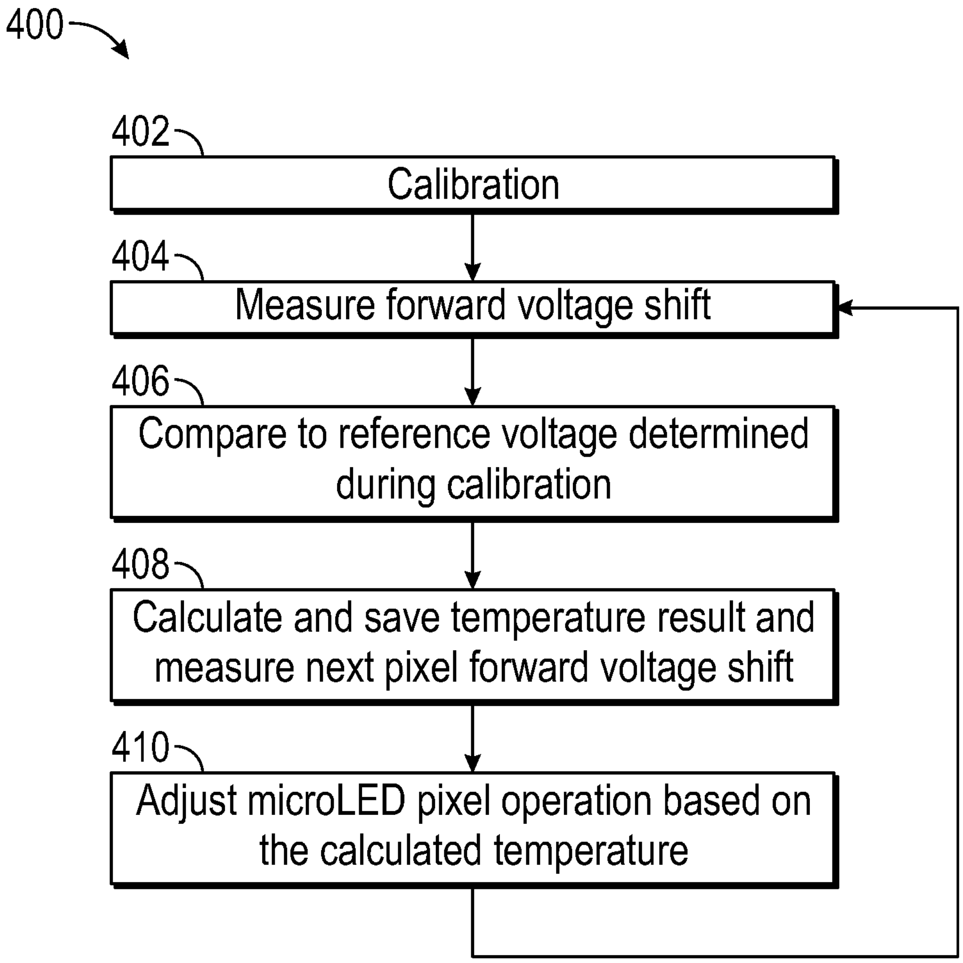
FIG. 4 illustrates an embodiment of a procedure for measuring pixel temperatures.

FIG. 4 illustrates one embodiment of a procedure 400 for measuring pixel temperatures. In a first operation 402, calibration is performed, such as to derive the junction temperature of individual LEDs from the LED voltage. In one embodiment, a reference temperature and corresponding voltage measurement is performed for all pixels with test results stored in the memory of a controller (e.g., a system controller or temperature monitoring and control block). To ensure accuracy, calibration can be performed during production of the micro-LED matrix at a well-controlled temperature and at different current values.

During operation of a produced micro-LED array, at operation 404, forward voltage of the LED pixel 330, 332 at the bus 350 can be measured. The operation 404 can be performed intermittently, on a repeating schedule, during a predetermined time, or the like. At operation 406, the controller or temperature monitoring and control block 352 recalls the saved relation data made during the calibration operation 402. The relation data regards the relationship between an LED pixel forward voltage and a junction temperature at a specific operating current. Next, at operation 406, controller or temperature monitoring and control block 352 can compare the measured voltage on the bus 350 and operating current to the stored relation data and derive the operating junction temperature of that LED. The control block 352 can save the temperature result and operate the state of the switches 346, 348 to measure the forward voltage of the next pixel. By scanning and measuring the LED pixels 330, 332 one by one, a temperature profile of the LED matrix can be obtained. The temperature profile can include a temperature of each of the LED pixels 330, 332 of the matrix array. This allows continuous, occasional or schedule adjustment of microLED pixels based on the measured temperature. If the determined, saved temperature is greater than a specified maximum temperature or less than a specified minimum temperature, the control block 352 can adjust an operating parameter of the microLED.

At operation 408, a temperature of the pixel can be determined based on the forward voltage shift determined at operation 404 and the reference voltage determined during calibration 402.

At operation 410, an amplitude of the current provided by the current source 334, 336 or the PWM duty cycle, which in turn affect the forward voltage of the LED 338, 340 can be adjusted. By increasing the current or the PWM duty cycle from the current source 334, 336, the forward voltage shifts due to the increase in the average current. According to FIG. 2, such an increase provides a decrease in the temperature at the PN junction of the LED 338, 340. Similarly, by decreasing the current from the current source 334, 336, the forward voltage shifts due to the decrease in the current. According to FIG. 2, the decrease provides an increase in the temperature at the PN junction of the LED 338, 340. In this way, the control block 352 can help ensure that the LED array does not overheat, consume too much current, or otherwise remains energy consumption efficient while balancing temperature concerns. That is, the control block 352 can balance temperature concerns with operational efficiency using the techniques described.

Figure 5:
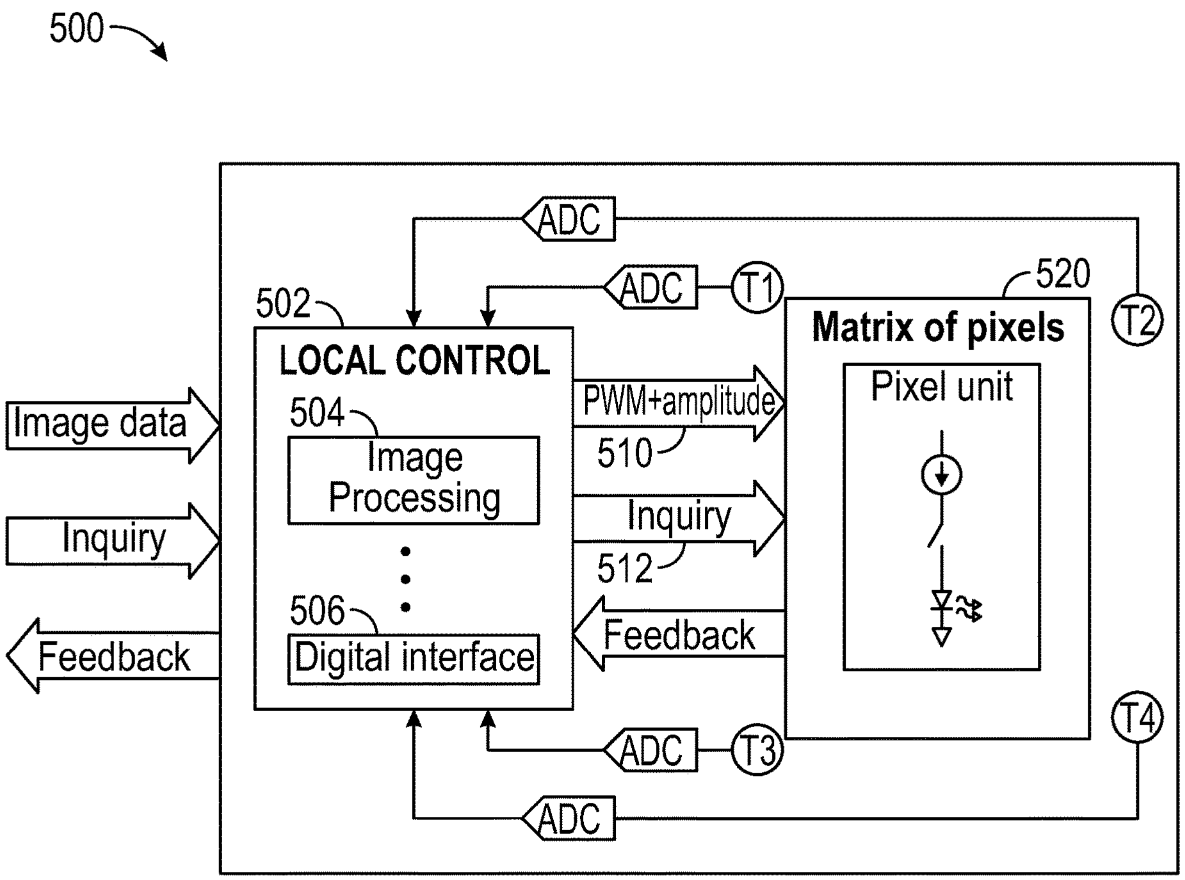
FIG. 5 illustrates an example of a system having a microLED control module.

FIG. 5 illustrates one example of a lighting matrix control system 500 having a suitable lighting logic and control module and/or pulse width modulation module to permit separately controlled and adjusted pixel intensity by setting appropriate ramp times and pulse width. Such adjusted pixel intensity, ramp times, or pulse width can help compensate for a temperature issue or a potential temperature issue. Addressable LED pixel activation can be used to provide patterned lighting, to reduce color or intensity variations, and to provide various pixel diagnostic functionality. A micro-LED array such as illustrated in FIG. 5 can contain arrays of thousands to millions of microscopic LED pixels that actively emit light and are individually controlled. To emit light in a pattern or sequence that results in display of an image, the current levels of the micro-LED pixels at different locations on an array can be adjusted individually according to a specific image. This can involve a pulse width modulation (PWM), which turns on and off the pixels at a certain frequency. During PWM operation, the average direct current (DC) through a pixel is the product of the current amplitude and the PWM duty cycle, which is the ratio between the conduction time and the period or cycle time.

Processing modules that facilitate efficient usage of the system 500 are illustrated in FIG. 5. The system 500 includes a control module 502 able to implement pixel or group pixel level control of amplitude and duty cycle for a micro-LED array. In some embodiments the system further includes an image processing module 504 to generate, process, or transmit an image, and digital control interfaces 506 such as inter-integrated circuit ($I^2C$) ($I^2C$ is a synchronous, multi-leader, multi-follower, packet switched, single-ended, serial communication bus) that are configured to transmit control data or instructions. The digital control interfaces 506 and control module 502 may include the system microcontroller and any type of wired or wireless module configured to receive a control input from an external device. By way of example, a wireless module may include blue tooth, Zigbee, Z-wave, mesh, WiFi, near field communication (NFC) and/or peer to peer modules may be used. The microcontroller may be any type of special purpose computer or processor that may be embedded in an LED lighting system and configured or configurable to receive inputs from the wired or wireless module or other modules in the LED system and provide control signals to other modules based thereon. Algorithms implemented by the microcontroller or other suitable control module 502 may be implemented in a computer program, software, or firmware incorporated in a non-transitory computer-readable storage medium for execution by the special purpose processor. Examples of non-transitory computer-readable storage mediums include a read only memory (ROM), a random-access memory (RAM), a register, cache memory, and semiconductor memory devices. The memory may be included as part of the microcontroller or may be implemented elsewhere, either on or off a printed circuit or electronics board The term module, block, circuitry, or the like, as used herein, may refer to electrical and/or electronic components disposed on individual circuit boards that may be soldered to one or more electronics boards. The term module may, however, also refer to electrical and/or electronic components that provide similar functionality, but which may be individually soldered to one or more circuit boards in a same region or in different regions. Electrical and/or electronic components can include one or more transistors, resistors, capacitors, diodes, amplifies, inductors, power supplies, memories, analog to digital converters (ADCs), digital to analog converters (DACs), switches, multiplexers, logic gates (e.g., AND, OR, XOR, negate, buffer, or the like), processor devices (e.g., central processing units (CPUs), graphics processing units (GPUs), field programmable gate arrays (FPGAs), application specific integrated circuits (ASICs), or the like), or the like.

As previously noted, control module 502 can further include the image processing module 504 and the digital control interfaces 506, such as can be implemented using $I^2C$. In some embodiments an image processing computation may be done by the control module 502 through directly generating a modulated image. Alternatively, a standard image file can be processed or otherwise converted to provide modulation to match the image. Image data that mainly contains PWM duty cycle values can be processed for all pixels in image processing module 504. Since amplitude is typically a fixed value or a value that is not change very often, amplitude related commands can be given separately through a different digital interface, (e.g., another $I^2C$, a controller area network (CAN), universal asynchronous transmitter/receiver (UART), serial peripheral interface (SPI), universal serial bus (USB), or the like). The control module 502 interprets the digital data, which is then used by a PWM generator of the control module 502 to generate PWM signals 510 for pixels, and by Digital-to-Analog Converter (DAC) signals 512 to generate the control signals for generating the required current source amplitude.

In some embodiments, discrete temperature sensors (T1-T4) can be used for temperature monitoring that can supplement or provide calibration for the described pixel level temperature monitoring system and method. In embodiments, the pixel matrix 520 in FIG. 5 can include m pixels that can support pixel level temperature measurements. In embodiments, the pixels are connected to current sources 334, 336 and a PWM switch 342, 344 such as previously described with respect to FIG. 4.

The control module 502 can be controlled by a higher-level controller, such as the temperature monitor and control system 122 (see FIG. 1) or command and control module 616 (see FIG. 6). The control module 502 can include or implement the functionality of the control block 352 or vice versa.

FIG. 6 illustrates in more detail one chip level implementation of a system 600 supporting functionality such as discussed with respect to FIGS. 1-5. The system 600 includes a command-and-control module 616 able to provide temperature control monitoring and control as well as implement pixel or group pixel level control of amplitude and duty cycle for pixel circuitry. In some embodiments, the system 600 further includes a frame buffer 610 for holding generated or processed images that can be supplied to an active LED matrix 620. Other modules can include digital control interfaces such as $I^2C$ serial bus 612 or SPI interface 614 that are configured to transmit needed control data or instructions.

In operation, system 600 can accept image or other data from a vehicle or other source that arrives via the SPI interface 614. Successive images or video data can be stored in an image frame buffer 610. If no image data is available, one or more standby images held in a standby image buffer 611 can be directed to the image frame buffer 610. Such standby images can include, for example, an intensity and spatial pattern consistent with legally allowed low beam headlamp radiation patterns of a vehicle, or default light radiation patterns for architectural lighting or displays.

In operation, pixels in the images are used to define response of corresponding LED pixels in the active matrix, with intensity and spatial or temporal modulation of LED pixels being based on the image(s). To reduce data rate issues, groups of pixels (e.g., K×L blocks of pixels where K and L are integers greater than one) can be controlled as single blocks in some embodiments. In embodiments, high speed and high data rate operation is supported, with pixel values from successive images able to be loaded as successive frames in an image sequence at a rate between 30 Hz and 100 Hz, with 60 Hz being typical. PWM can be used to control each pixel to emit light in a pattern and with an intensity at least partially dependent on the image held in the image frame buffer 610.

In some embodiments, the system 600 can receive logic power via Vdd and Vss pins. An active matrix receives power for LED array control by multiple VLED and VCathode pins. The SPI interface 614 can provide full duplex mode communication using a master-slave architecture with a single master. The leader device originates the frame for reading and writing. Multiple follower devices are supported through selection with individual follower select (SS) lines. Input pins can include a Leader Output Follower Input (MOSI), a Leader Input Follower Output (MISO), a chip select (SC), and clock (CLK), all connected to the SPI interface 614. The SPI interface connects to an address generator, frame buffer, and a standby frame buffer. Pixels can have parameters set and signals or power modified (e.g., by power gating before input to the frame buffer, or after output from the frame buffer via pulse width modulation or power gating) by a command-and-control module. The SPI interface 614 can be connected to an address generation module 618 that in turn provides row and address information to the active matrix 620. The address generator module 618 in turn can provide the frame buffer address to the frame buffer 610.

In some embodiments, the command-and-control module 616 can be externally controlled via an $I^2C$ serial bus 612. A clock (SCL) pin and data (SDA) pin with 7-bit addressing can be supported. The command-and-control module 616 can include a digital to analog converter (DAC) and two analog to digital converters (ADC). These are respectively used to set Vbias for a connected active matrix, help determine maximum $V_f$, and determine system temperature. Also connected are an oscillator (OSC) to set the pulse width modulation oscillation (PWMOSC) frequency for the active matrix 620. In embodiments, a bypass line is also present to allow address of individual pixels or pixel blocks in the active matrix for diagnostic, calibration, or testing purposes. The active matrix 620 can be further supported by row and column select that is used to address individual pixels, which are supplied with a data line, a bypass line, a PWMOSC line, a Vbias line, and a Vf line.

As will be understood, in some embodiments the described circuitry and active matrix 620 can be packaged and optionally include a submount or printed circuit board connected for powering and controlling light production by the semiconductor LED. In certain embodiments, the printed circuit board can also include electrical vias, heat sinks, ground planes, electrical traces, and flip chip or other mounting systems. The submount or printed circuit board may be formed of any suitable material, such as ceramic, silicon, aluminum, etc. If the submount material is conductive, an insulating layer is formed over the substrate material, and the metal electrode pattern is formed over the insulating layer. The submount can act as a mechanical support, providing an electrical interface between electrodes on the LED and a power supply, and also provide heat sinking.

More generally, light emitting active matrix pixel arrays such as discussed herein may support applications that benefit from fine-grained intensity, spatial, and temporal control of light distribution. This may include, but is not limited to, precise spatial patterning of emitted light from pixel blocks or individual pixels. Depending on the application, emitted light may be spectrally distinct, adaptive over time, and/or environmentally responsive. The light emitting pixel arrays may provide pre-programmed light distribution in various intensity, spatial, or temporal patterns. The emitted light may be based at least in part on received sensor data and may be used for optical wireless communications. Associated optics may be distinct at a pixel, pixel block, or device level. An example light emitting pixel array may include a device having a commonly controlled central block of high intensity pixels with an associated common optic, whereas edge pixels may have individual optics. Common applications supported by light emitting pixel arrays include video lighting, automotive headlights, architectural and area illumination, street lighting, and informational displays.

Light emitting matrix pixel arrays may be used to selectively and adaptively illuminate buildings or areas for improved visual display or to reduce lighting costs. In addition, light emitting pixel arrays may be used to project media facades for decorative motion or video effects. In conjunction with tracking sensors and/or cameras, selective illumination of areas around pedestrians may be possible. Spectrally distinct pixels may be used to adjust the color temperature of lighting, as well as support wavelength specific horticultural illumination.

Street lighting is an important application that may greatly benefit from use of light emitting pixel arrays. A single type of light emitting array may be used to mimic various street light types, allowing, for example, switching between a Type I linear streetlight and a Type IV semicircular streetlight by appropriate activation or deactivation of selected pixels. In addition, street lighting costs may be lowered by adjusting light beam intensity or distribution according to environmental conditions or time of use. For example, light intensity and area of distribution may be reduced when pedestrians are not present. If pixels of the light emitting pixel array are spectrally distinct, the color temperature of the light may be adjusted according to respective daylight, twilight, or night conditions.

Light emitting arrays are also well suited for supporting applications requiring direct or projected displays. For example, warning, emergency, or informational signs may all be displayed or projected using light emitting arrays. This allows, for example, color changing or flashing exit signs to be projected. If a light emitting array is composed of a large number of pixels, textual or numerical information may be presented. Directional arrows or similar indicators may also be provided.

Vehicle headlamps are a light emitting array application that requires large pixel numbers and a high data refresh rate. Automotive headlights that actively illuminate only selected sections of a roadway can used to reduce problems associated with glare or dazzling of oncoming drivers. Using infrared cameras as sensors, light emitting pixel arrays activate only those pixels needed to illuminate the roadway, while deactivating pixels that may dazzle pedestrians or drivers of oncoming vehicles. In addition, off-road pedestrians, animals, or signs may be selectively illuminated to improve driver environmental awareness. If pixels of the light emitting pixel array are spectrally distinct, the color temperature of the light may be adjusted according to respective daylight, twilight, or night conditions. Some pixels may be used for optical wireless vehicle to vehicle communication.

Additional Notes and Examples

Example 1 includes a light emitting diode (LED) array temperature monitor and control system comprising a first driver coupled to a first pixel connected to a bus by a first switch, a second driver coupled to a second pixel connected to a bus by a second switch, and a control block coupled to the first and second switches, the control block operable to turn on the first switch and turn off the second switch, measure a bus voltage on the bus of the first pixel while the first switch is turned on and the second switch is turned off, determine, based on the bus voltage, an LED forward voltage shift of the first pixel and a corresponding temperature shift for the first pixel based on the LED forward voltage shift, and adjust a driving current for the first pixel based on the temperature shift.

In Example 2, Example 1 can further include, wherein the LED array comprises a microLED pixel array.

In Example 3, at least one of Examples 1-2 can further include, wherein the control block is further operable to turn on the second switch and turn off the first switch, measure, while the second switch is turned on and the first switch is turned off, a second bus voltage, determine, based on the second bus voltage, an LED forward voltage shift of the second pixel and corresponding temperature shift for the second pixel based on the determined LED forward voltage shift of the second pixel, and adjust a driving current for the second pixel based on the determined temperature.

In Example 4, at least one of Examples 1-3 can further include, wherein the first and second switches are a subset of n-switches coupled to the bus in the LED array, and the control block is further operable to turn off all but one switch of the n-switches on the bus and turn on the one switch, measure a bus voltage of a third pixel coupled to the one switch, and determine a corresponding temperature shift for the third pixel based on the measured bus voltage of the third pixel.

In Example 5, at least one of Examples 1-4 can further include, wherein adjustments to the driving current for the first pixel based on the temperature shift include changes to at least one of current amplitude or pulse width modulation duty cycle.

In Example 6, at least one of Examples 1-5 can further include, wherein the first and second driver further respectively comprise first and second current sources, the first and second driver are respectively coupled in series to first and second pulse width modulation switches, and the first and second pulse width modulation switches are respectively coupled in parallel with the first and second switches.

In Example 7, at least one of Examples 1-6 can further include, wherein the control block is operable to determine temperature dependency by a calibration that includes dependency based on at least one of LED design, manufacturing factors, or supplied current.

Example 8 includes a micro light emitting diode (microLED) pixel array system, comprising a bus, a plurality of microLED pixels connected to the bus, each of the microLED pixels including an LED driver and an LED, and a control block connected to the drivers of the microLED pixels, the control block operable to measure LED forward voltage on the bus, determine LED forward voltage shift based on the measure LED forward voltage, determine, based on the determined LED forward voltage shift, a corresponding temperature shift for a microLED pixel of the plurality of microLED pixels electrically connected to the bus, and adjust a current provided by the LED driver of the microLED pixel based on the determined temperature shift.

In Example 9, Example 8 can further include an image processing module connected to the control block, the image processing module indicating a pulse width modulation duty cycle and amplitude of current to be provided by the microLED driver of the corresponding microLED pixel.

In Example 10, at least one of Examples 8-9 can further include, wherein the control block is further operable to control switches, connected in parallel, in each of the plurality of microLED pixels.

In Example 11, Example 10 can further include, wherein the switches include n switches, each of the n switches electrically connected to n buses, n>2, the control block further operable to open different n−1 switches on each bus of the buss leaving a different switch closed on each bus of the n-buses and measure a forward voltage on each of the n-buss in a single clock cycle.

In Example 12, at least one of Examples 8-11 can further include, wherein adjustments to the current provided by the LED driver based on the determined temperature shift are based on changes to at least one of pixel array supplied current amplitude or pulse width modulation.

In Example 13, at least one of Examples 8-12 can further include, wherein the control block is operable to determined temperature dependency by a calibration that includes dependency based on at least one of LED design, manufacturing factors, and supplied current.

In Example 14, at least one of Examples 10-13 can further include, wherein each driver further respectively comprises a current source, and an electrical connection to a pulse width modulation switch, the pulse width modulation switch electrically connected in series with the current sources and electrically connected in parallel with a switch of the switches.

Example 15 includes a control method for an LED array, the method comprising providing a plurality of microLED pixels connected to a bus, each pixel independently addressable by a control block, measuring, for each of the plurality of microLED pixels, a forward voltage shift, comparing the measured forward voltage shift to a reference voltage determined during a calibration, and calculating and saving temperature results for each of the plurality of microLED pixels.

In Example 16, Example 15 can further include receiving, at a driver of the microLED pixels and from an image processing module, an amplitude and pulse width modulation duty cycle corresponding to an image.

In Example 17, at least one of Examples 15-16 can further include, wherein the measuring the forward voltage shift includes turning off all but one of a plurality of switches electrically connected to the bus to measure the forward voltage shift of a microLED pixel connected to the switch.

In Example 18, at least one of Examples 15-17 can further include repeatedly measuring the forward voltage shift of the plurality of microLEDs during operation.

In Example 19, at least one of Examples 15-18 can further include adjusting electrical control of the microLED pixels based on the temperature.

In Example 20, Example 19 can further include, wherein adjusting electrical control includes changing an electrical current or a pulse width modulation duty cycle for the LED pixel Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein. In those embodiments supporting software-controlled hardware, the methods, procedures, and implementations described herein may be realized in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

The invention claimed is:

1. A light emitting diode (LED) array temperature monitor and control system comprising:

a first driver coupled to a first pixel connected to a bus by a first switch;

a second driver coupled to a second pixel connected to a bus by a second switch; and a control block coupled to the first and second switches, the control block operable to:

turn on the first switch and turn off the second switch, measure a bus voltage on the bus of the first pixel while the first switch is turned on and the second switch is turned off, determine, based on the bus voltage, an LED forward voltage shift of the first pixel and a corresponding temperature shift for the first pixel based on the LED forward voltage shift, and adjust a driving current for the first pixel based on the temperature shift.

2. The system of claim 1, wherein the LED array comprises a microLED pixel array.

3. The system of claim 1, wherein the control block is further operable to:

turn on the second switch and turn off the first switch, measure, while the second switch is turned on and the first switch is turned off, a second bus voltage, determine, based on the second bus voltage, an LED forward voltage shift of the second pixel and corresponding temperature shift for the second pixel based on the determined LED forward voltage shift of the second pixel, and adjust a driving current for the second pixel based on the determined temperature.

4. The system of claim 1, wherein:

the first and second switches are a subset of n-switches coupled to the bus in the LED array, and the control block is further operable to:

turn off all but one switch of the n-switches on the bus and turn on the one switch, measure a bus voltage of a third pixel coupled to the one switch, and determine a corresponding temperature shift for the third pixel based on the measured bus voltage of the third pixel.

5. The system of claim 1, wherein adjustments to the driving current for the first pixel based on the temperature shift include changes to at least one of current amplitude or pulse width modulation duty cycle.

6. The system of claim 1, wherein:

the first and second driver further respectively comprise first and second current sources, the first and second driver are respectively coupled in series to first and second pulse width modulation switches, and the first and second pulse width modulation switches are respectively coupled in parallel with the first and second switches.

7. The system of claim 1, wherein the control block is operable to determine temperature dependency by a calibration that includes dependency based on at least one of LED design, manufacturing factors, or supplied current.

8. A micro light emitting diode (microLED) pixel array system, comprising:

a bus;

a plurality of microLED pixels connected to the bus, each of the microLED pixels including an LED driver and an LED; and a control block connected to the drivers of the microLED pixels, the control block operable to:

measure LED forward voltage on the bus, determine LED forward voltage shift based on the measure LED forward voltage;

determine, based on the determined LED forward voltage shift, a corresponding temperature shift for a microLED pixel of the plurality of microLED pixels electrically connected to the bus, and adjust a current provided by the LED driver of the microLED pixel based on the determined temperature shift.

9. The microLED pixel array system of claim 8, further comprising:

an image processing module connected to the control block, the image processing module indicating a pulse width modulation duty cycle and amplitude of current to be provided by the microLED driver of the corresponding microLED pixel.

10. The microLED pixel array system of claim 8, wherein the control block is further operable to control switches, connected in parallel, in each of the plurality of microLED pixels.

11. The microLED pixel array system of claim 10, wherein the switches include n switches, each of the n switches electrically connected to n buses, n>2, the control block further operable to:

open different n−1 switches on each bus of the buses leaving a different switch closed on each bus of the n-buses, and measure a forward voltage on each of the n-buses in a single clock cycle.

12. The microLED pixel array system of claim 8, wherein adjustments to the current provided by the LED driver based on the determined temperature shift are based on changes to at least one of pixel array supplied current amplitude or pulse width modulation.

13. The microLED pixel array system of claim 8, wherein the control block is operable to determine temperature dependency by a calibration that includes dependency based on at least one of LED design, manufacturing factors, and supplied current.

14. The microLED pixel array system of claim 10, wherein each driver further respectively comprise a current source, and an electrical connection to a pulse width modulation switch, the pulse width modulation switch electrically connected in series with the current sources and electrically connected in parallel with a switch of the switches.

15. A control method for an LED array, comprising:

providing a plurality of microLED pixels connected to a bus, each pixel independently addressable by a control block;

measuring, for each of the plurality of microLED pixels, a forward voltage shift, wherein the measuring the forward voltage shift includes turning off all but one of a plurality of switches electrically connected to the bus to measure the forward voltage shift of a microLED pixel of the plurality of microLED pixels connected to the switch;

comparing the measured forward voltage shift to a reference voltage determined during a calibration; and calculating and saving temperature results for each of the plurality of microLED pixels.

16. The control method for an LED array of claim 15, further comprising, receiving, at a driver of the microLED pixels and from an image processing module, an amplitude and pulse width modulation duty cycle corresponding to an image.

17. The control method for an LED array of claim 15, further comprising repeatedly measuring the forward voltage shift of the plurality of microLEDs during operation.

18. The control method for an LED array of claim 15, further comprising adjusting electrical control of the microLED pixels based on the temperature.

19. The control method for an LED of claim 18, wherein adjusting electrical control includes changing an electrical current or a pulse width modulation duty cycle for the LED pixel.

* * * * *